United States Patent Office 3,506,294
Patented Apr. 14, 1970

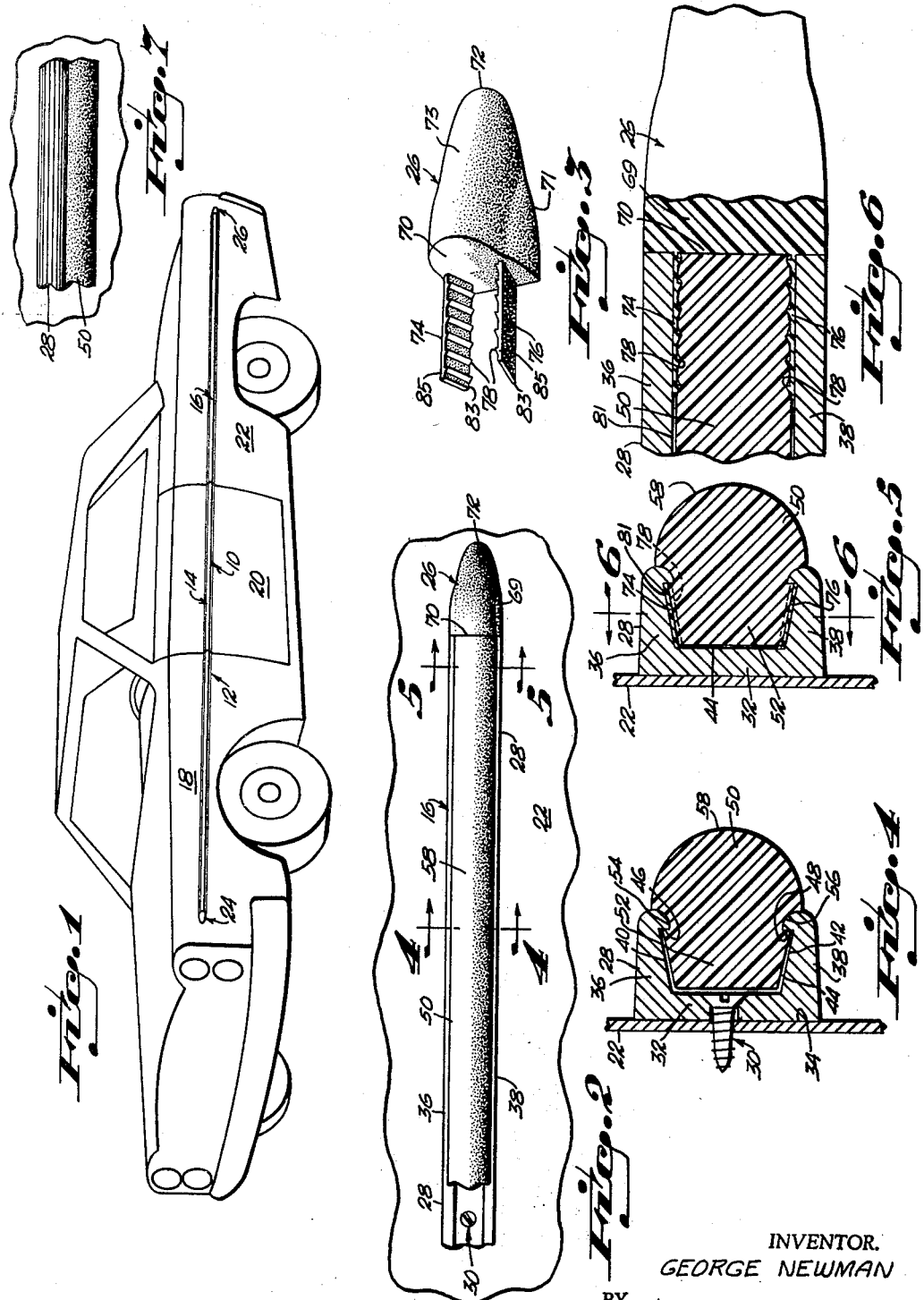

3,506,294
BUMPER GUARD ASSEMBLY
George Newman, Miami, Fla., assignor to Biscayne Manufacturing Corporation, Miami, Fla.
Filed Oct. 24, 1968, Ser. No. 770,304
Int. Cl. B60r 13/04
U.S. Cl. 293—1                                    5 Claims

ABSTRACT OF THE DISCLOSURE

An elongate, narrow decorative strip and bumper guard assembly for the outer sidewalls of a motor vehicle proportioned to materially reduce the amount of metal required in the supporting structure without loss of load distribution upon a surface to which the assembly has been applied, such as caused by an impact upon the bumper guard assembly, and while at the same time maintaining an appearance of a materially wider supporting structure when viewed in the direction of an observer as it is normally viewed when assembled on a motor vehicle. The assembly includes: an elongate relatively narrow, decorative channel-type holder having a flat attaching web and sidewalls extending in perpendicular relation from the plane of the web, the sidewalls having substantially parallel outer surfaces and inner surfaces tapering outwardly from the web and terminating in confronting terminal in-turned ledges providing a receiving channel of trapezoidal cross-section for the reception of an elongate yieldable bumper element, the outer surface of the ledges being rounded. The bumper element is provided with a trapezoidally shaped base for reception in the channel of the holder and an enlarged central dome-shaped crown overlying the outer ends of the sidewalls and ledges from approximately the apex of the rounded sidewalls and the inwardly directed ledges and providing an elongate shock-absorbing bumper guard element of rounded contour flanked by narrow decorative retaining walls secured to the vehicle.

---

This invention relates to a narrow elongate, decorative bumper guard assembly for the sidewalls of a motor vehicle. The sidewalls of vehicles are frequently subjected to impact, as when the vehicle is parked in a parking lot, and the doors of adjacently positioned vehicles are opened whereupon the edges of the doors being opened strike against portions of the parked vehicle. This damages the finish of the car and defaces the metal thereby creating a roughened appearance which detracts from the beauty of the vehicle.

Bumper guards extending longitudinally of the vehicle have heretofore been provided to protect the finish of vehicles, such as the improved bumper guard assembly of U.S. Patent No. 3,359,030. Such bumper guards have been of relatively wide contour to distribute the load over the surface of a vehicle and include a pair of flanking ogee portions, which, of course, requires a substantial amount of flanking material, which is ordinarily of relatively heavy and expensive material.

An object of this invention is to provide, in combination, an improved end cap and an elongate decorative strip and bumper guard assembly of a narrow configuration which can be applied to the side panels of a motor vehicle to protect the side panels from impact from the doors of adjacent vehicles and other blows which would injure the finish, which does not include the ogee portions, thereby materially reducing the amount of metallic material required by the holder portion of the assembly, which holder portion is configured so as not to interfere with the shock of impact, i.e., the load distributing ability, of the assembly occasioned by an impact, while at the same time, retaining the beauty as seen by an observer so as not to interfere with the contour and design lines of a vehicle on which it is installed and intended so as not to clash with the design of that vehicle.

This invention has as an object the provision of an improved end cap with slender legs of a bifurcated portion to be received in the same channel in which the rubbery shock absorbing material of the bumper guard assembly is received in a holder portion, as is explained hereinafter, to provide a slender or narrow bumper guard assembly of favorable load distribution character.

Another object of this invention is to provide, in combination, (a) an improved end cap with a slender pair of legs and (b) an elongate, narrow channel type holder, and (c) a resilient, slightly foreshortened bumper guard member in the channel together with the slender legs embracing the end of the resilient member and captivated between it and the channel to close the end openings into the channel, so as not to interfere with the decorative aspects of the holder when secured to the sides of a vehicle. Thus, the need for the relatively expensive and heavy material of the holder ogee portions is obviated without materially reducing the area of attachment or load distributing surface; the holder sidewalls extend in generally perpendicular relation to the plane of the web of the holder so that the line of sight view of a person standing beside a vehicle, i.e., looking down at about a 45 degree angle at the assembly as mounted, see FIGURE 7 of the drawings in contrast to FIGURE 2, is such that a considerable area of the decorative metal portion of the assembly is seen in relation to the area which is viewed of the rubbery material if it is seen as in FIGURE 2.

Still a further object of this invention is to provide an end cap for an elongate bumper guard assembly for a vehicle which includes a relatively narrow holder having substantially parallel outer sidewalls and an elongate bumper strip of rubbery material received in the holder and having a rounded outer dome-shaped crown of a contrasting color and material to that of the holder, the height of the sidewalls of the holder being proportioned in relation to the height of the crown such that the line of sight view as seen by a person standing beside the vehicle is such that the face presented is composed of a relatively balanced view, areawise, of the rubbery material of the bumper and of the metallic appearing holder.

Another object of this invention is to provide an improved end closure member for a narrow, decorative bumper guard assembly in which the end closure member includes a body and a bifurcated portion defining slender legs extending in a common direction with each of the confronting surfaces of the legs being spaced apart a distance slightly less than the distance across the base of the bumper of rubbery material and being provided with inclined teeth or attaching blades so that the legs are adapted to be inserted between the metallic material of the holder with the teeth permitting penetration of the legs between the holder and the bumper body in the direction of insertion and with the inclined teeth acting as barbs which tend to bite into the surface of the rubbery material of the bumper and resist withdrawal so as to securely connect the end closure to the other elements of the bumper guard assembly.

Yet a further object of this invention is to provide an elongate decorative strip and bumper guard assembly which can be manufactured economically and can be readily installed on vehicles of various manufacture to protect the doors and side panels of the vehicle from injury occasioned by impact from any source.

The foregoing and other objects of this invention will now be described with reference to the accompanying drawing in which:

FIGURE 1 is a perspective view of an automobile embodying this invention;

FIGURE 2 is an enlarged fragmentary view which has been partly broken away and which illustrates a portion of the narrow bumper guard assembly installed on an automobile vehicle panel;

FIGURE 3 is an enlarged perspective view of an end closure member for the bumper guard and decorative strip member;

FIGURE 4 is an enlarged sectional view taken substantially on the line 4—4 of FIGURE 2 and looking in the direction of the arrows;

FIGURE 5 is an enlarged sectional view taken substantially on the line 5—5 of FIGURE 2 and looking in the direction of the arrows;

FIGURE 6 is an enlarged fragmentary view taken substantially on the line 6—6 of FIGURE 5 and looking in the direction of the arrows; and FIGURE 7 is a fragmentary view illustrating the bumper guard assembly as viewed at an angle of approximately 45 degrees.

Referring now to the drawings, wherein like reference characters designate similar parts throughout the different views, the elongate decorative strip and the bumper guard assembly is designated by the numeral 10. As illustrated, the bumper guard assembly may be formed in several segments, such as the forward, intermediate and rearward sections 12, 14 and 16 respectively secured to the front panel 18, the door 20 and the rear panel 22 of a vehicle. The forward segment and the rearward segment 12 and 16 are closed at their outermost ends by end closures 24 and 26, illustrated in FIGURES 1, 2 and 3, and which will be described more fully hereinafter after the description of the holder and the rubbery bumper guard received in the holder, now to be described.

First, it will be apparent as reference is made to FIGURE 2, wherein the bumper guard section 16 is illustrated, that a holder, similar to that designated by the numeral 28 in FIGURES 4 to 6 may be secured as indicated in FIGURE 1 to the panel 18 or the door 20 by suitable headed members or fasteners 30, which will be described. The elongate holder 28 is of channel form as more fully illustrated in FIGURES 4 and 5, has a web 32 having a planar or flat undersurface adapted to lie in flush contact with the outer surface 34 of the panel to which it is desired to attach the bumper assembly. Spaced walls 36 and 38 extend outwardly from the web 32 and have substantially parallel outer side walls as illustrated in FIGURES 5 and 6. The area of the web 32 per unit of longitudinal length of the holder between and underlying the adjacent surfaces of the walls 36 and 38 presents a flat surface of substantial area to distribute the force of a blow on the bumper guard assembly which would otherwise strike the vehicle on which it is attached, the distribution avoiding chipping or marring of the finish or painted surface 34. The inner side surfaces 40 and 42 of the side walls 36 and 38 diverge outwardly or taper from the web 32 and thereby provide wall sections of progressively decreasing thickness outwardly from the web 32 to define therebetween an elongate channel of trapezoidal configuration 44 terminating in inwardly directed ledges 46 and 48 or lips projecting into the channel 44 and confronting each other in spaced relation and defining a constricted mouth opening for the channel.

An elongate bumper body 50 of substantial yieldable material is received in the channel. The body 50 is of uniform, symmetrical cross section throughout its length and is configured to include a lower or base portion 52 of generally trapezoidal configuration conforming to the cross-section of the elongate trapezoidal shaped channel 44 of the holder. The base portion 52 is of a height proportioned to be snuggly received within the channel 44 below or as confined on the web side of the lips in longitudinally extending receiving grooves to be described. The longitudinal side walls of the base are, however, foreshortened with respect to the inside surface of the side walls of the channel as seen in section to define longitudinally extending slots, one on each side of the bumper body 50 between it and the side walls of the holder. The base portion 52 of the bumper body 50 is provided with longitudinally extending grooves 54 and 56 at the upper edge of the trapezoidally shaped portion 52 to define the aforesaid longitudinally extending lip receiving grooves, for the reception of the confronting inwardly directed confining ledges or lips 46 and 48 of the holder 28. The bumper body is also configured so that, above the laterally extending grooves 54 and 56, an enlarged and rounded dome-shaped crown 58 is provided extending outwardly from the outermost plane of the lips, i.e., from the rounded outer ends of the side walls 36 and 38 and the ledges or lips 46 and 48. It is thus apparent that in view of the structure described above, the bumper body 50 is adapted to be received within the holder by a force directed against the bumper pushing it into a captivated condition within the holder; however, before describing the operation of the application of the bumper guard assembly to a vehicle, reference will now be made to the end closures designated in FIGURE 1 by the numerals 24 and 26.

Referring to FIGURE 3, the end closures 26 is shown in perspective. It will be seen, on reference to FIGURE 2, that the end closure includes a body section 69 having a face or plane of abutment 70 to engage the end face of the channel holder and a lower flat or smooth face 71 at all times flush with the plane of abutment 32 of the web of the holder and the panel 22 as seen in FIGURE 4. The body section surface 73 merges and blends from the plane of abutment to the surface to which it is applied in a smoothly contoured curvilinear surface to provide a streamlined and progressively decreasing cross-sectional area to the end 72 remote from the plane of abutment 70. From the plane of abutment, a bifurcated portion extends in generally perpendicular relation. The bifurcated portion includes a first and a second leg 74 and 76. Each of these legs is spaced a distance from the plane of engagement with the surface of a vehicle, that is, the plane 71 a distance slightly less than the thickness of the web 32 and each of the legs is of a thickness slightly greater than the thickness of the slots 81 between the side walls of the holder and the normal lateral dimension of the bumper of rubbery material. Further, the legs are tilted so as to define a diverging angle between the surfaces designated by the numeral 83 and the surfaces 85 with the distance between these planes 83 and 85 being substantially the same as but slightly less than the distance between the channel side face of the web and the underside of the lip. Thus, the legs are configured so as to be received in the slots and captivated beneath the ledge pinching the end of the bumper guard which is also captivated by the same retaining ledges. Additionally, in the preferred embodiment, the inner surfaces of the legs are provided with corrugations or rugae 78 which define a plurality of crests and troughs or a slightly deformed surface with blades, preferably oriented vertically and in alignment extending from the main plane of the leg outwardly and slightly toward the plane of abutment 70 terminating in a sharp outer end or biting surface. In the preferred embodiment, the blades 78 act, as seen in FIGURE 6, to grip and retain the assembly of the end cap, holder and the resilient rubber material as a unit when it has been applied to a vehicle.

In applying the bumper guard assembly to a vehicle, an intermediate strip 14 of the bumper guard assembly 10 of appropriate length is mitered at its ends so as to be relieved and permit of swinging movement of the door, and secured to the panel 20 by a plurality of suitable, headed fasteners, such as screws 30, having a relatively flat head portion received in a countersunk recess 61 in the channel side face of the web 32 so as to be flush therewith. Thereafter, the forward and rearward segments are mitered at the door side ends and secured in a similar fashion, as is indicated in FIGURE 4, to the panels 18 and 22, self-tapping sheet metal screws being preferred for this operation. Any number of fasteners may be employed to securely clamp the strip and bumper guard assembly to the vehicle side. Thereafter, the bumper of rubbery material is applied to the intermediate strip 14 and from the door edge of each of the panels 18 and 22 outwardly to a point at about the end of the channel. This is done by applying a force pushing the rubbery material into the channel until the longitudinally extending receiving groove receives the confronting lips and holds the bumper securely in position. Before the end portion of the channel is filled with the rubbery material by pushing it into the channel, the end cap, either 24 or 26, is inserted with the legs, which are normally biased slightly so that the terminal or distal ends are somewhat closer together than the proximal ends, are placed into the channel with the normal resiliency of the material tending to expand the legs into close overlaying and captivated relation within the channel beneath the lips. Thereafter, the rubber material is pressed into the channel and, as this is done, the blades grip the end of the rubbery material and tightly confine it, while at the same time holding the end cap in position resisting withdrawal of it by movement longitudinally away from the holder. By reason of this construction, the ogee portions to receive the legs and define a channel to receive them is not required, and a more slender, decorative and neat appearing bumper is provided with the end cap legs being tightly received as indicated in FIGURE 6. Substantially less metal is required to form the holder, and it is of significantly lighter weight in relation to other such bumper guard assemblies. Also, when viewed in the normal position from which such a bumper assembly is normally viewed, that is, from slightly above, the device provides a pleasing balance between the material of the rubbery bumper portion and the metallic or chrome-like surface of the side wall of the holder 28. This is in contrast to the predominant area of the resilient bumper 50 as it appears when viewed, for example, in FIGURE 2 in a perpendicular relation, the direction in which an impact will be received on the bumper guard assembly in the event of a door opening from an adjacent car. Thus, there has been provided an improved, light-weight, decorative bumper guard assembly which is inexpensive to manufacture and is of sturdy material and adapted to distribute a load from an impact and protected the surface of a vehicle with no sharp edges to bite into the paint or finish being presented to the surface of a car or panel thereon.

In the preferred embodiment, the range of rigidity within which the plastic material, which is the preferred material of the end closure, is such that it is harder than that of the bumper material with the result that the teeth or blades of the confronting surfaces of the legs bite firmly into the more yieldable material of the base portion of the bumper.

In the preferred embodiment, the height of the outer walls of the holder is preferably about ¼ inch and in the range of between $3/16$ and $5/16$ inch. Also, the projection of the crown or dome from the plane of the outer end of the side walls of the holder is of the same range and preferably slightly less than that of the height of the side walls. The span of the web between the outer side walls of the holder may be less than ½ inch but in the preferred embodiment is greater than $5/16$ of an inch.

What is claimed is:

1. In combination, a narrow elongate decorative strip and bumper assembly for the outer sidewalls of a motor vehicle comprising;

(a) an elongate holder, including a web having a planar load distributing undersurface, and spaced sidewalls extending substantially perpendicularly from the outer longitudinal opposite edges of said web a common distance defining an elongate channel, each of said side walls including a retaining lip projecting toward one another in confronting relation and defining a constricted channel mouth;

(b) an elongate body of substantially yieldable material of uniform, symmetrical cross section, including as seen in cross section, a dome-shaped crown and a base, (c) said bumper body having outwardly opening longitudinally extending receiving grooves along the line of juncture of the dome-shaped crown and said base of said mumper body sized for the snug reception of the confronting ledges of the spaced walls of said elongate holder, whereby the bumper body is adapted to be captivated in said channel by a pressing force perpendicular to the plane of said web, (d) said base being sized for receipt in the channel in captivated relation beneath the lips with the sidewalls of said base parallel to and in closely adjacent overlaying relation of the confronting surfaces of the sidewalls of said channel, but spaced therefrom a distance defining a thin, longitudinally extending receiving slot beneath the lips, (e) said dome-shaped crown having a lateral dimension greater than the lateral span of the channel mouth and less than the distance between the outer surfaces of said spaced sidewalls adjacent the ledges;

(f) fastening means extending through the web for attachment to the planar undersurface of the web in substantially flush engagement with a surface on which the assembly is mounted, said fastening means including a through recess in the web and a headed member to extend through said web, said recess having an enlarged entrance mouth in the channel side face of the web to receive the head of said member, (g) said sidewalls of the holder being of a height from the undersurface of the web to their respective terminal ends of between $3/16$ inch and $5/16$ inch and the height of said dome-shaped crown from the plane of said line of juncture being such in relation to the height of said sidewalls that, when the assembly is oriented in a horizontal attitude and with said undersurface being aligned with the vertical and viewed at an elevation angle from a point above the horizontal line of approximately 45 degrees, the line of sight will be such that the material of the holder will present a face to the viewer approximately equal to and relatively large in relation to the face of the bumper body; and (h) at least one end cap comprising a body having an abutment surface to close the end of said channel and a bifurcated portion extending in generally perpendicular relation from said abutment surface and defining a pair of slender legs sized, spaced and oriented with respect to said longitudinally extending receiving slots for receipt therein beneath the lips, said body having a planar surface in the plane of said undersurface when said legs are in said slot and said body being configured to smoothly merge and blend from the holder and the bumper body at the plane of abutment and to taper longitudinally away from said plane of abutment to a smoothly contoured terminal end at said surface.

2. The improvement as set forth in claim 1 wherein said retaining lips are each on the terminal end of said side walls.

3. The improvement as set forth in claim 1 wherein said side walls between said web and said terminal ends diverge outwardly toward said retaining lips from said web.

4. The improvement as set forth in claim 1 wherein each of said slender legs includes a lateral dimesion substantially equal to but slightly less than the height of the side walls of the elongate holder between the undersurface of the web to the terminal ends for snug receipt in said receiving slots.

5. The improvement as set forth in claim 4 wherein the confronting surfaces of said slender legs are each provided with rugae on the confronting surfaces, each of the ruga extending across said lateral dimension of each leg constituting an antifriction means to permit substantially vertical movement of said elongate bumper bodies depthwise between the side walls to deform the adjacent surface of the bumper body of said receiving slot, said end caps being of a harder material than the material of said bumper body so that the rugae bite into the surface and resist withdrawal of the legs by forces applied longitudinally of the center line of said assembly.

References Cited

UNITED STATES PATENTS

| | | | |
|---|---|---|---|
| 1,972,283 | 9/1934 | Zimmers | 280—163 |
| 2,959,146 | 11/1960 | Erkert | 114—219 |
| 3,359,030 | 12/1967 | Newman | 293—1 |
| 3,388,523 | 6/1968 | Evans | 52—717 |

ARTHUR L. LA POINT, Primary Examiner

H. BELTRAN, Assistant Examiner

U.S. Cl. X.R.

293—62, 71; 52—717